United States Patent [19]
Balzer et al.

[11] 3,715,556
[45] Feb. 6, 1973

[54] SLAB HEATING METHOD AND APPARATUS

[75] Inventors: Norbert R. Balzer, Parma; Robert J. Kasper, Seven Hills, both of Ohio

[73] Assignee: Park-Ohio Industries, Inc., Cleveland, Ohio

[22] Filed: Oct. 5, 1970

[21] Appl. No.: 78,088

[52] U.S. Cl. ..........219/10.69, 219/10.41, 219/10.57
[51] Int. Cl. ............................H05b 5/00, H05b 9/00
[58] Field of Search..219/10.41, 10.57, 10.61, 10.69, 219/10.71, 10.75, 10.79

[56] References Cited

UNITED STATES PATENTS

| | | | |
|---|---|---|---|
| 3,505,492 | 4/1970 | Ross | 219/10.71 X |
| 2,459,622 | 1/1949 | Lohoe et al. | 219/10.41 |
| 3,562,470 | 2/1971 | Bobart et al. | 219/10.69 X |

*Primary Examiner*—J. V. Truhe
*Assistant Examiner*—Hugh D. Jaeger
*Attorney*—Marechal, Biebel, French & Bugg

[57] ABSTRACT

A preheated slab of metal is moved through induction heating units to raise its temperature prior to rolling. Electric radiant heating devices are spaced along the slab before and after it passes through the induction heating units to maintain the elevated temperature of the slab by directing radiant heat toward the slab in an amount sufficient to compensate for heat loss from the slab to the atmosphere.

5 Claims, 5 Drawing Figures

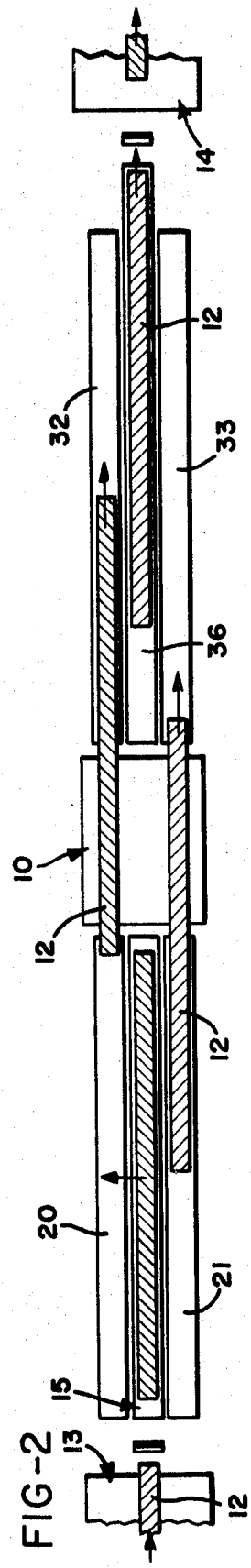
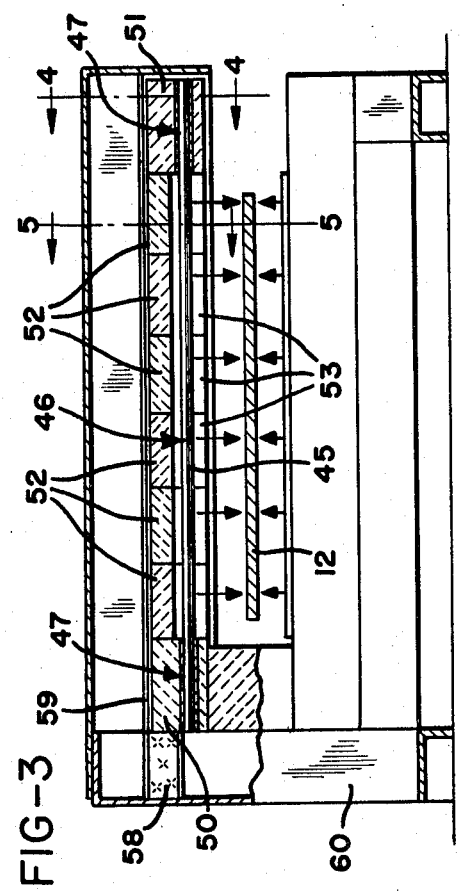
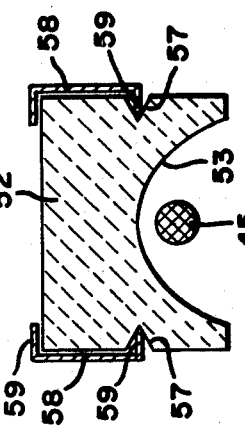
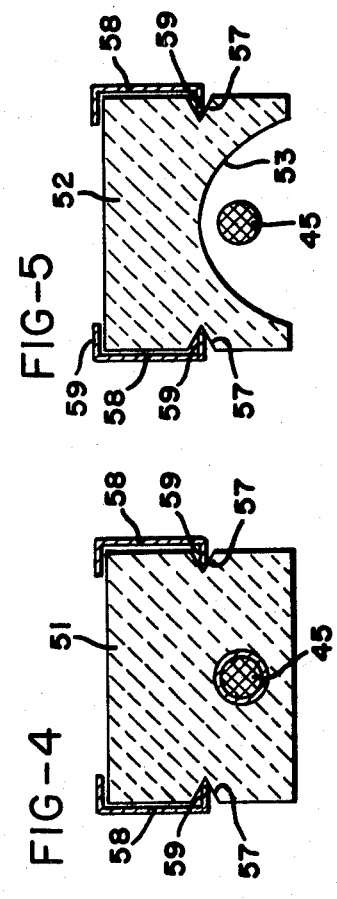

SLAB HEATING METHOD AND APPARATUS

BACKGROUND OF THE INVENTION

In a process for converting scrap steel into reuseable sheet steel, scrap steel fragments are packed into a box which is heated to about 1,400°F. and then compressed by passing the box through a rolling mill. After the first rolling operation, the resulting slab of steel is reheated to over 2,000°F. and rolled again.

Heating of the slab of metal is preferably done by induction heating units, and for practical consideration the number of heating units is limited. Since only a relatively small portion of the steel slab is heated by the induction heating units at any one time, that portion of the slab outside the induction heating unit will be radiating heat to the cooler surroundings.

SUMMARY OF THE INVENTION

This invention relates to a method and apparatus for maintaining the elevated temperature of a slab of material by directing heat toward the material in a quantity sufficient to compensate for the heat loss from the material to the atmosphere. The invention also relates to an apparatus for transfering the slab of material from an infeed table to first and second, slower moving, heating lines where its temperature is maintained until it passes through induction heating units, and then for transforming the slab to a faster moving outfeed table.

In the preferred embodiment of the invention, a plurality of heater elements are positioned between the roll stands of inlet and exit tables for an induction heating unit. A slab of material received on the inlet table is normally heated to an elevated temperature, usually in the order of approximately 1,400°F., and has passed through a first rolling mill. This elevated temperature is maintained by the radiant heating units positioned along the length of the slab on the inlet table since the heaters direct heat of a quantity sufficient to compensate for the heat loss by the material to the atmosphere, either by radiation or convection.

Similar radiant heating devices are positioned between the roll stands on the exit table which receives the slab of material from the induction heating units. The induction heating units are designed to raise the temperature of the slab to approximately 2,000°F. prior to the slab being rolled a second time. Since the temperature of the slab on the exit table is higher than on the inlet table, the radiant heaters are operated at a higher temperature since the heat losses are higher.

In the embodiment of the invention described herein, the rolling mills are capable of processing the slab of material at twice the speed at which the slab can be moved through the induction heating units. For this reason, two induction heating units, each with associated inlet and exit tables, are provided each line. The slab of material is received onto an infeed table, transferred from the infeed table to one of the inlet tables where it is moved through the induction heating units, and then transferred to an outfeed table and directed to the second rolling mill.

Accordingly, it is an object of this invention to provide an improved process for heating a slab of material prior to rolling wherein the slab of material is heated to an elevated temperature and wherein its temperature is maintained by directing heat toward the material in a quantity sufficient to compensate for the heat loss from the material to the atmosphere.

It is another object of this invention to provide an improved process for maintaining the elevated temperature of a slab of material which has been preheated to an elevated temperature by directing heat toward the material in a quantity sufficient to compensate for heat loss from the material to the atmosphere, heating the material to a higher temperature, and maintaining the higher temperature of the material by directing additional heat toward the material in a quantity sufficient to compensate for heat loss from the material to the atmosphere.

Another object of this invention is to provide an improved apparatus for heating and maintaining the temperature of a slab of material which includes means for supporting a slab of material for movement through induction heating means, radiant heaters positioned to direct heat toward the slab of material after it has been heated by the induction heating means in a quantity substantially to compensate for the heat loss from the material to the atmosphere so that the elevated temperature of the material is maintained.

A further object of this invention is to provide an improved apparatus for heating and maintaining the temperature of the slab of material which has been preheated to an elevated temperature which includes an induction heating means, electric radiant heaters positioned on the inlet side of the induction heating means to direct heat toward the material in a quantity sufficient to maintain its original temperature, and means on the exit side of the induction heating means to direct heat toward the material to compensate for the heat loss from the material to the atmosphere after moving through the induction heating means.

Another object of this invention is to provide an apparatus for use in heating slabs of material to an elevated temperature including an infeed table for receiving the slabs at a first rate of speed, first and second inlet tables for moving the slabs through induction heaters at a second, slower rate of speed, a cross over mechanism for transferring the slabs alternately from the infeed table to the first and second inlet tables, an outfeed table for receiving the slabs after they are heated by the induction heaters, and a second cross over mechanism for transferring the slabs to the outfeed table. Both the inlet and outlet tables for the induction heaters include means for maintaining the elevated temperature of the slabs.

Other objects and advantages of the invention will be apparent from the following description, the accompanying drawings and the appended claims.

BRIEF DESCRIPTION OF THE DRAWINGS

FIG. 2 is a simplified plan view of a slab received onto an infeed table from a first rolling mill, the cross transfer of the slab to one of two inlet tables, an induction heating unit, and a cross transfer of the slab from exit tables to an outfeed table where the slab is then processed by a second rolling mill;

FIG. 3 is a view partly in cross section showing the construction of a radiant heating device constructed according to this invention;

FIG. 4 is a cross sectional view taken along line 4—4 in FIG. 3; and

FIG. 5 is a cross sectional view taken along line 5—5 in FIG. 3.

DESCRIPTION OF THE PREFERRED EMBODIMENT

Figure 1:
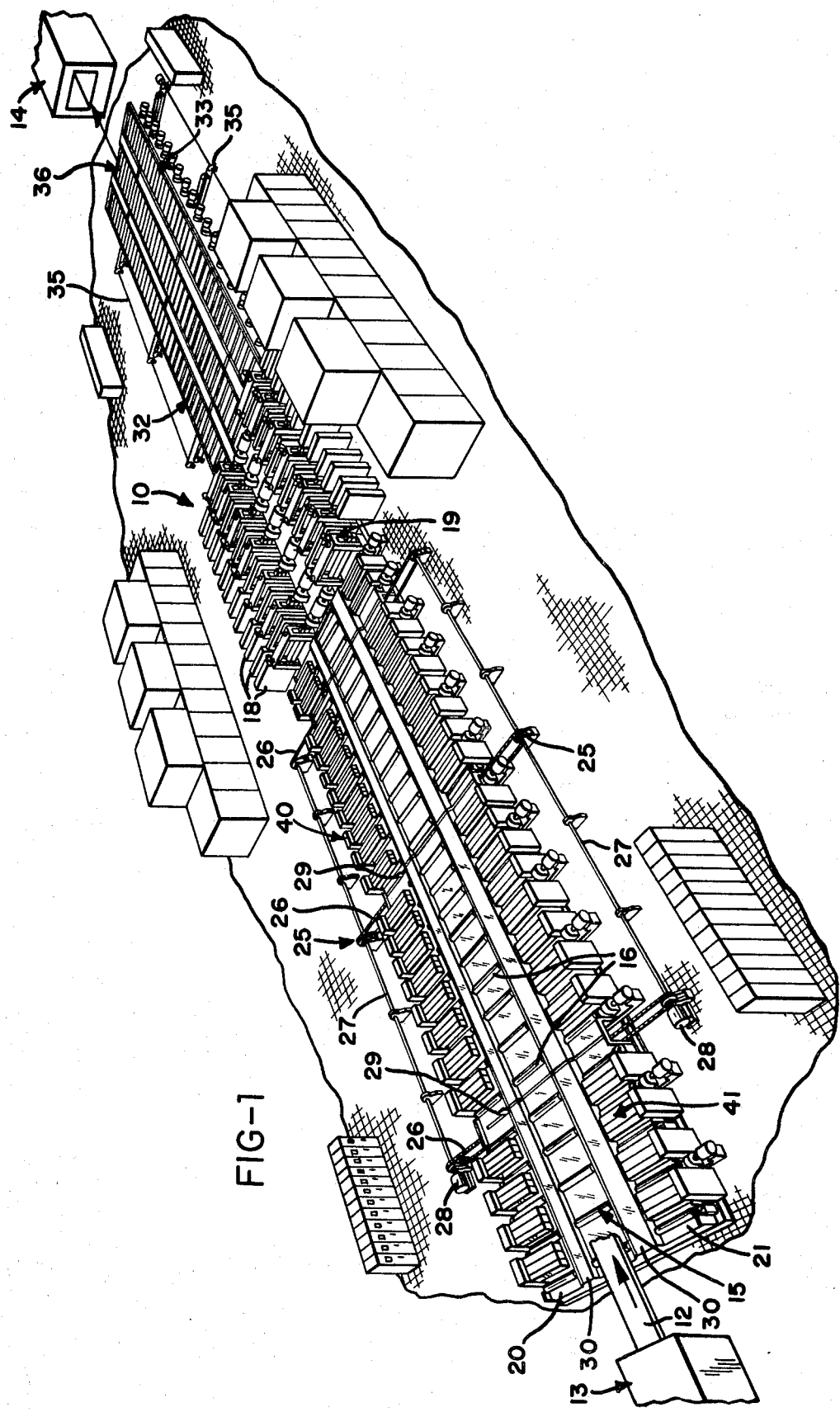
FIG. 1 is a pictorial view showing a slab heating device with the radiant heating devices of this invention located on the inlet tables to a pair of induction heating units.

Referring now to the drawings which show a preferred embodiment of the invention, and particularly to FIGS. 1 and 2, an apparatus for heating a slab of material is shown which includes an induction heating unit 10 for receiving and heating a slab of material 12 from a first rolling mill 13. In the embodiment shown in the drawings, the slab of material 12 is typically one and one-quarter inch thick, 48 inches wide and 98 feet long. The slab 12 is preheated to approximately 1,400°F. prior to the first rolling operation. The induction heating unit 10 raises the temperature of the slab 12 to over 2,000°F., and then the slab is passed through a second rolling mill 14. This compacting of the steel by rolling at high temperature makes the steel scrap useable in many applications.

The slab 12 is received on an infeed table 15 which includes a plurality of roll stands 16, some of which are powered by DC drive motors, not shown, to move the slab away from the rolling mill 13.

Since the slab is moved through the rolling mill 13 at a rate faster than it is moved through the induction heating units 10, dual induction heating units 18 and 19 are provided with the slabs moving through these induction heating units alternately. The induction heating units are preferably operated continuously, to utilize the power equipment at its maximum duty cycle thereby reducing the total power required since idle time in the power converters which are used to supply power to the induction heating units is eliminated. Water cooled cast iron rolls are included between the elements of the induction heating units 18 and 19 to support the slab, but are not shown in FIG. 1.

A slab 12 is received onto the infeed table 15 and then transferred to either inlet table 20 or 21 by cross over mechanism 25 for processing through the induction heating units 18 and 19, respectively. Both inlet tables 20 and 21 also include a plurality of roll stands, preferably hollow high temperature alloy nickel chrome steel rolls, with every other roll being driven by a DC motor.

As shown in FIG. 1, cross over mechanism 25 includes three industrial mill type chains 26 driven by a jack shaft 27 which is rotated by DC drive motors 28. Each chain 26 includes a drag type dog 29 which will alternately move a slab from the infeed table 15 to one or the other of the inlet tables 20 or 21. Skid rails 30 are included between the infeed table 15 and the inlet tables.

After passing through the induction heating units 10, the slabs are received on exit tables 32 and 33. Cross over mechanism 35 moves the slabs from the exit tables to an outfeed table 36 where the slab moves into the second rolling mill 14. Both the exit tables 32 and 33 and the outfeed table 36 include a plurality of roll stands, some of which are driven by DC drive motors.

Since only a portion of the slab is heated by the induction heating units 18 or 19 at any one time, and since the portion of the slabs outside the heating units will radiate heat to the atmosphere and cool, this invention contemplates the use of radiant electric heaters to direct heat toward the slab of material in a quantity sufficient to compensate for the heat loss by the material to atmosphere, either due to radiation or convection.

As shown in FIG. 1, electric radiant heating assemblies 40 and 41 are installed on the inlet tables 20 and 21. Similar radiant heating assemblies are also provided on the exit tables 32 and 33, although these are not shown in FIG. 1 for the purpose of clarity of illustration.

In the preferred embodiment of the invention, the radiant heating assemblies include three heating units grouped together and positioned between the roll stands in the inlet and exit tables. These heating units include heating elements positioned on both the top and bottom of the slab of material to direct sufficient radiant energy toward the material to compensate for the heat loss by the material to the atmosphere while the material awaits either heating by the induction heating unit or rolling by the rolling mill 14. The radiant heating units are not designed to add any substantial heat to the material, but only to compensate for loss in heat from the material to maintain its temperature.

Each radiant heating unit includes a silicon carbide resistor element 45, as shown in FIGS. 3–5, mounted both above and below the slab 12. The elements on the inlet side of the induction heating units 10 are designed to operate at approximately 1,600°F. while those on the exit side of the induction heating units operate at approximately 2,100°F.

In the preferred embodiment, the silicon carbide resistance heating elements 45 are manufactured by Norton Company, Worchester, Massachusetts. These resistance heating elements include a centrally located hot zone 46 and impregnated cold ends 47 to which electrical connection is made.

The resistance heating elements 45 are supported in end blocks 50 and 51 which have openings 52 formed therein to receive the cold ends 47 of the elements. Located between the end blocks 50 and 51 are a plurality of refractory blocks 52 which have formed therein parabolic openings 53. The heater elements 45 are positioned at the focal points of these parabolas. End blocks 50, and heater blocks 52 are preferably formed from a cast refractory material, such as aluminum oxide.

The refractory blocks 50, 51 and 52 include notches 57 formed horizontally on their outer side walls. These blocks are supported on a steel structure by a C-shaped, heavy gauge metal sheet 58 which includes inwardly extending tracks 59 which are received into the notches 57. The entire assembly is supported by a single vertical stand 60. One end of the assembly is open to allow for the lateral movement of the slab 12 when it is transferred from the infeed table 15 to the inlet tables 20 or 21.

Thus, a novel method and apparatus have been disclosed wherein a preheated slab of material is heated further by passing the material through induction heating units, and the elevated temperature of the material is maintained by directing radiant heat toward the material of a quantity sufficient to compensate for the heat loss from the material. Since the entire slab is not heated at one time, and therefore a portion of the slab is exposed, more uniform temperatures in the slab can be maintained by utilizing this invention.

While the method and form of apparatus herein described constitutes preferred embodiments of the invention, it is to be understood that the invention is not limited to this precise method and form of apparatus, and that changes may be made therein without departing from the scope of the invention which is defined in the appended claims.

What is claimed is:

1. A process for heating a slab of material prior to rolling including the steps of preheating said material, maintaining said material at the preheated temperature by directing heat toward said material in a quantity sufficient to compensate for the heat loss from said material, moving said material through heating means to raise the temperature of said material a portion at a time, and maintaining the raised temperature of the entire slab of material after it has moved through said heating means by directing additional heat toward said material in a quantity sufficient to compensate for the heat loss from said material to the atmosphere.

2. Apparatus for heating and maintaining the temperature of a slab of material which has been previously heated to an elevated temperature including induction heating means, means for supporting said material prior to movement through said induction heating means, means for directing heat toward said material to compensate for heat loss from said material to the atmosphere prior to the material moving through said induction heating means, means for supporting said material after passing through said induction heating means, means for moving said slab of material through said induction heating means to raise its temperature a portion at a time, and further means for directing heat toward the entire slab of material after passing through said induction heating means of a quantity to compensate for heat loss from said material so that its temperature is maintained at substantially the temperature obtained from said induction heating means.

3. The apparatus of claim 2 wherein said means for directing heat includes electric radiant heaters positioned on the outfeed side of said induction heating means and wherein said electric radiant heaters compensate for the heat loss of said material to the atmosphere.

4. Apparatus for use in heating to elevated temperatures a slab of material including infeed means for receiving the material at a first rate of speed;

first and second means for heating the material a portion at a time to an elevated temperature;

first and second means for moving the material through said first and second heating means, respectively, at a second rate of speed approximately one half of said first rate of speed;

means for transferring the material from said infeed means alternately to said first and second moving means;

outfeed means for discharging the material from said apparatus at said first rate of speed;

second means for transferring the material alternately from said first and second means to said outfeed means after heating to the elevated temperature whereby the material is received and discharged at the same rate of speed but passed through said first or second heating means at said second rate of speed; and means for directing heat toward the entire slab of material after it moves through said first or second heating means of a quantity to compensate substantially for the heat loss from the material so that its temperature is maintained at substantially the temperature obtained in said heating means.

5. The apparatus of claim 4 wherein the material is heated to an elevated temperature prior to heating by said first and second heating means, said apparatus further including means for maintaining the material at the elevated temperature prior to further heating by said first and second heating means.

* * * * *